May 15, 1962 D. D. STOLTMAN 3,034,487
WATER INJECTION CONTROL SYSTEM FOR INTERNAL COMBUSTION ENGINE
Filed Jan. 6, 1961
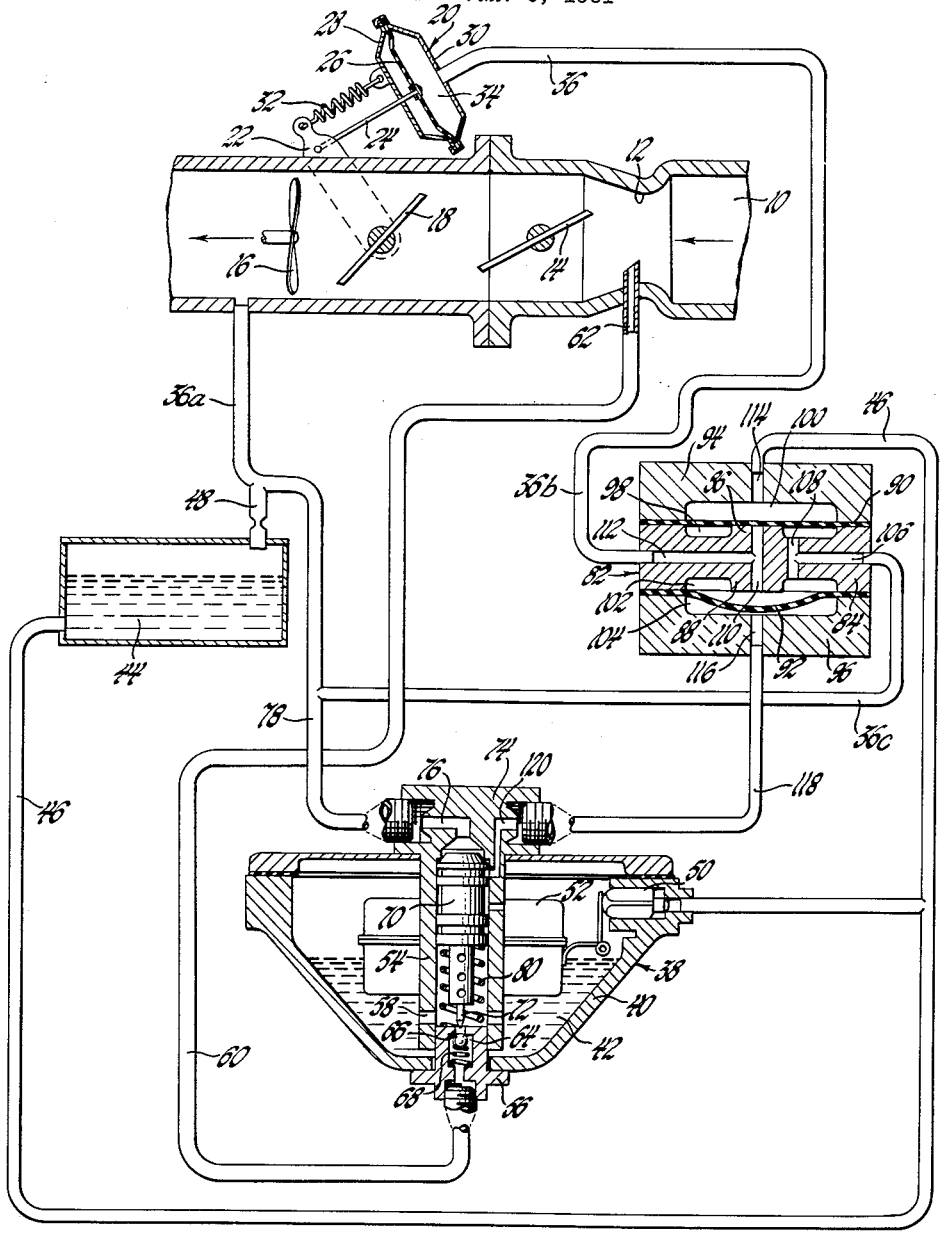
INVENTOR.
Donald D. Stoltman
BY
C. P. Bernard
ATTORNEY

United States Patent Office 3,034,487
Patented May 15, 1962

3,034,487
WATER INJECTION CONTROL SYSTEM FOR INTERNAL COMBUSTION ENGINE
Donald D. Stoltman, Henrietta, N.Y., assignor to General Motors Corporation, Detroit, Mich., a corporation of Delaware
Filed Jan. 6, 1961, Ser. No. 80,998
9 Claims. (Cl. 123—25)

The present invention relates to a water injection system for a supercharged engine. Many engines today are designed to operate under high power output conditions for prolonged periods. Such engines are not, however, economical to operate under normal operating conditions. The present invention is preferably intended for use with a low powered engine the output of which may be significantly increased for short periods of operation through the use of supercharging and water injection.

Such systems are in general well known. In order to commercially utilize a supercharged and water injected engine, it is imperative that the supercharged or boosted induction pressure be limited in the event the water injection system becomes inoperative to supply water. The present invention relates to a control system which insures that in the event the water injection mechanism becomes inoperative, for whatever reason, the supercharged or boosted pressure will be reduced preventing damage to the engine.

In general, the present charge forming system includes a carburetor induction passage including a normal throttle valve, a blower or supercharger adapted to boost the induction pressure posteriorly of the throttle, and a diaphragm controlled throttle intermediate the blower and manual throttle which is adapted to automatically throttle air flow in the event the water injection system becomes inoperative.

The details as well as other objects and advantages of the present invention will be apparent from a perusal of the detailed description which follows.

The drawing is a diagrammatic representation of a charge forming device embodying the subject invention.

A carburetor induction passage is indicated at 10 and includes a venturi 12 disposed anteriorly of a manually controllable throttle valve 14. A blower or supercharger is indicated at 16 and is adapted to boost the induction pressure posteriorly of throttle valve 14 whenever particularly high power output is required of the engine.

A second throttle valve 18 is rotatably disposed in induction passage 10 and its operation automatically controlled by a diaphragm device indicated generally at 20. Throttle valve 18 is fixed to a lever 22 which is connected through a rod 24 to a diaphragm 26 peripherally clamped between a pair of casing members 28 and 30. A spring element 32 is connected between casing 28 and throttle lever 22 to bias valve 18 in a normally open position. Chamber 34, defined by diaphragm 26 and casing 30, is adapted to be connected to induction passage 10 posteriorly of blower 16 by a conduit 36a so that, under conditions to be subsequently described, blower boost pressure may act on diaphragm 26 to move throttle valve 18 in a closing direction to limit the boost pressure and prevent engine damage.

A water metering or injection mechanism is indicated generally at 38 and includes a casing 40 defining a water reservoir 42. A water storage tank 44 is adapted to supply reservoir 42 through a conduit 46. A branch passage 48 connects boost pressure conduit 36a with the water storage tank thereby tending to force water from the tank into reservoir 42. An inlet valve 50 is provided in casing 40 and is controlled by a float 52 to regulate the quantity of water supplied to the reservoir. When the water level in reservoir 42 has reached a predetermined level, float 52 will close valve 50 preventing further inflow of water.

A cylindrical casing 54 is disposed within reservoir 42 and is supported by casing 40. A small valve body 56 is fitted within the lower end of cylindrical casing 54 and is adapted to communicate the interior of the cylindrical casing and reservoir 42, through radial ports 58 with the throat of induction passage venturi 12 through a conduit 60. Conduit 60 communicates with the induction passage through a tube 62 having a beveled end whereby air flow through the induction passage may induce water flow through the conduit.

A ball valve member 64 is normally biased against a seat 66 by a spring 68 with a force sufficient to prevent a water flow through conduit 60.

A plunger 70 is slidably disposed within casing 54 and includes a stem having a reduced portion 72 adapted to extend through seat 66 to engage ball valve 64. A fitting 74 is secured to the upper end of cylindrical casing 54 and includes a passage 76 communicating with boost pressure branch conduit 78. When boost pressure reaches a predetermined value requiring the injection of water into the induction system, this pressure will act on the top of plunger 70 to move the same downwardly against the force of spring 80. Plunger stem 72 will unseat ball valve 64 permitting water to be induced into induction passage 10. When boost pressure is below the predetermined value, plunger 70 will be maintained in its upper position by spring 80 permitting valve 64 to block the flow of water into the induction passage.

As already generally noted, in the event of the inability of water metering mechanism 38 to supply water to the induction passage under conditions of high boost pressure, the engine would be severely damaged if some means were not provided for reducing such pressure. To this end, a boost pressure limiting valve assembly 82 is interposed in boost pressure conduit 36b between the induction passage and diaphragm device 20. Valve assembly 82 includes a central casing 84 which includes depressed portions in the opposite faces thereof which form valve seats or bosses 86 and 88. A pair of flexible diaphragm valve elements 90 and 92 are respectively clamped between cover casings 94 and 96 and center casing 84. Diaphragm 90 coacts with casings 84 and 94 to provide chambers 98 and 100 while diaphragm 92 similarly defines chambers 102 and 104 in conjunction with casings 84 and 96.

Center casing 84 includes a partially extending longitudinal passage 106 which connects at one end with boost pressure passage 36c and terminates at its other end in transverse passage 108 communicating with diaphragm chambers 98 and 102. Another transverse passage 110 is formed through bosses 86 and 88 and also communicates with diaphragm chambers 98 and 102. Transverse passage 110 connects with a second longitudinal passage 112, thereby communicating the valve assembly with throttle controlling device 20.

Ports 114 and 116 are formed in cover casings 94 and 96 and respectively connect with water supply conduit 46 and a boost pressure conduit 118. Boost pressure conduit 118 connects at its other end with a passage 120 formed through end fitting 74 and cylindrical casing 54 of the metering mechanism. When plunger 70 is depressed, boost pressure will be transmitted through passage 120 to diaphragm chamber 104 seating diaphragm 92 against boss 88 thereby preventing communication between transverse passages 108 and 110 through chamber 102.

Under the same conditions, water pressure in conduit 46 seats diaphragm 90 against boss 86 similarly preventing communication between the transverse passages 103 and 110 through chamber 98.

The double diaphragm arrangement and passages provide parallel flow paths through valve assembly 82. Under normal operating conditions, it is desired that both of the flow paths be blocked by the respective diaphragms 90 and 92 whereby boost pressure is prevented from acting on diaphragm device 20 and throttle 18 is maintained in an open position by spring 32. However, in the event water in reservoir 42 is exhausted, the water pressure in conduit 46 will be diminished to such an extent that the boost pressure acting in chamber 98 will lift diaphragm 90 and be admitted to device 20. Diaphragm 26 will be moved against the force of spring 32 to move throttle 18 in a closing direction to reduce boost pressure and prevent the engine from being damaged.

Similarly, if the water in the system should freeze, plunger 70 could not be depressed. Under this circumstance boost pressure would unseat flexible diaphragm 92 again permitting boost pressure to move throttle valve 18 in a closing direction.

Thus, if for any reason metering mechanism 32 is unable to supply water to induction passage 10 under conditions when the boost pressure has reached a predetermined value, throttle valve 18 will be automatically moved in a closing direction to protect the engine from self-destruction.

It is apparent that the present invention has been diagrammatically represented in the drawing and various structural modifications of said system are possible within the intended scope of the hereinafter appended claims.

In the claims:

1. A charge forming device for an internal combustion engine comprising an air induction passage, a throttle valve for controlling flow through said passage, blower means for boosting air pressure posteriorly of said throttle valve, means for injecting water into said induction passage when the boost pressure exceeds a predetermined value, and an additional throttle means in the induction passage for automatically reducing said boost pressure in the event the water injecting means is unable to supply water to the induction passage.

2. A charge forming device for an internal combustion engine comprising an air induction passage, a throttle valve for controlling flow through said passage, blower means for boosting air pressure posteriorly of said throttle valve, means for injecting water into said induction passage when the boost pressure exceeds a predetermined value, and means for automatically reducing said boost pressure in the event the water injecting means is unable to supply water to the induction passage, the water injecting means including a reservoir, a conduit connecting the reservoir with the induction passage anteriorly of the blower means, a spring biased valve means normally blocking the flow of water through the conduit means, a boost pressure responsive member adapted to open the spring biased valve means when said pressure exceeds a predetermined value permitting water to be supplied to said induction passage.

3. A charge forming device for an internal combustion engine comprising an air induction passage, a throttle valve for controlling flow through said passage, blower means for boosting air pressure posteriorly of said throttle valve, means for injecting water into said induction passage when the boost pressure exceeds a predetermined value, and means for automatically reducing said boost pressure in the event the water injecting means is unable to supply water to the induction passage, the boost pressure reducing means including a second throttle valve, a diaphragm device connected to the second throttle, spring means normally biasing the second throttle in an open position, conduit means communicating the induction passage posteriorly of the blower means with the diaphragm device whereby boost pressure is adapted to urge the second throttle valve in a closing direction, valve means disposed in said conduit means blocking boost pressure from acting on the diaphragm device when the water injecting means is operative to supply water to said induction passage.

4. A charge forming device as set forth in claim 3 in which the water injecting means includes a reservoir, a conduit connecting the reservoir with the induction passage anteriorly of the blower means, a spring biased valve means normally blocking the flow of water through the conduit means, a boost pressure responsive member adapted to open the spring biased valve means when said pressure exceeds a predetermined value permitting water to be supplied to said induction passage.

5. A charge forming device as set forth in claim 4 in which the boost pressure responsive member coacts with said valve means to block said boost pressure from acting on the diaphragm device when said member is operative to act on the spring biased valve means.

6. A charge forming device as set forth in claim 3 in which said valve means includes casing means, a pair of diaphragm valve elements disposed within the casing means and coacting with said conduit means to provide a pair of parallel related flow paths through the casing means, said diaphragm valve elements being normally seated to block flow through the parallel related flow paths when the water injecting means is operative to supply water to the induction passage.

7. A charge forming device as set forth in claim 6 in which the water injecting means includes a reservoir, a conduit connecting the reservoir with the induction passage anteriorly of the blower means, a spring biased valve means normally blocking the flow of water through the conduit means, a boost pressure responsive member adapted to open the spring biased valve means when said pressure exceeds a predetermined value permitting water to be supplied to said induction passage.

8. A charge forming device as set forth in claim 7 in which the casing means includes first and second ports respectively communicating with chambers defined by the respective diaphragm valve elements and the casing means, a first conduit connected to the first port and adapted to transmit a first pressure indicative of reservoir water level to the associated diaphragm valve element, a second conduit connected to the second casing port and adapted to transmit a second pressure indicative of the operability of the boost pressure responsive member to the associated diaphragm valve element, said first and second pressures being adapted respectively to seat the diaphragm valve elements and block boost pressure flow through said valve means when the water injecting means is operative to supply water to the induction passage.

9. A charge forming device for an internal combustion engine comprising an air induction passage, a first throttle for controlling flow through said passage, blower means for boosting air pressure posteriorly of said throttle, a second throttle disposed in said induction passage intermediate the first throttle and said blower means, spring means normally biasing said second throttle in an open position, a diaphragm device connected to said second throttle and adapted to move the same in a closing direction, a water metering mechanism including a first conduit terminating at one end in communication with the induction passage anteriorly of said first throttle and communicating at the other end with said metering mechanism, a water tank, a second conduit communicating said tank and said metering mechanism, said metering mechanism including a first valve means for controlling the flow of water to said first conduit, a boost pressure conduit communicating with the induction passage posteriorly of the blower means, said boost pressure conduit communicating with the reservoir to force water to the metering mechanism and with said first valve means to cause water to flow to the induction passage when the boost pressure exceeds a predetermined value, said boost pressure conduit also being adapted to communicate with the diaphragm device to close the second throttle, and a valve device normally blocking the admission of boost pressure to the diaphragm device as long as the metering mechanism is able to supply water to the induction passage.

References Cited in the file of this patent
UNITED STATES PATENTS

| | | |
|---|---|---|
| 2,445,337 | Robinson | July 20, 1948 |
| 2,482,040 | Thorns et al. | Sept. 13, 1949 |
| 2,533,863 | Wirth et al. | Dec. 12, 1950 |
| 2,649,081 | Martienssen | Aug. 18, 1953 |